Oct. 30, 1951 L. L. PRUEHS 2,573,600
STRAIN RELIEF BUSHING
Filed Dec. 17, 1948
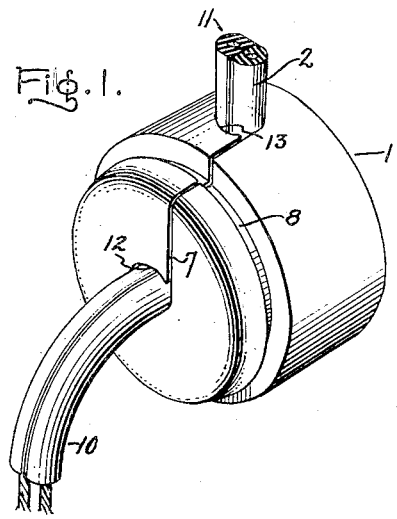
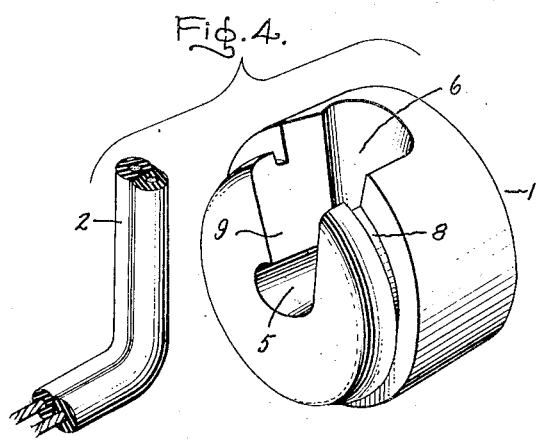
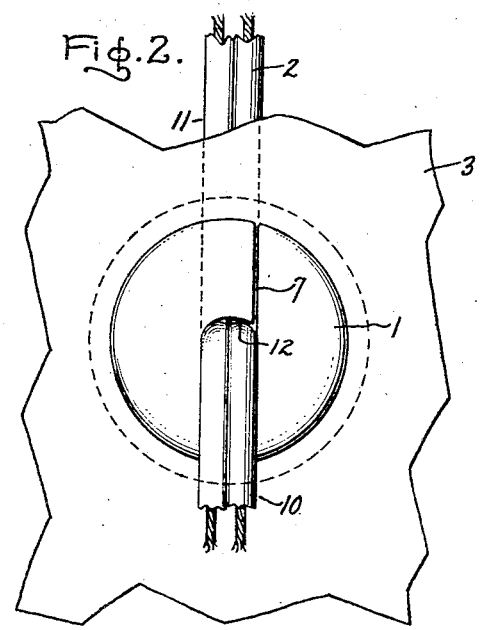
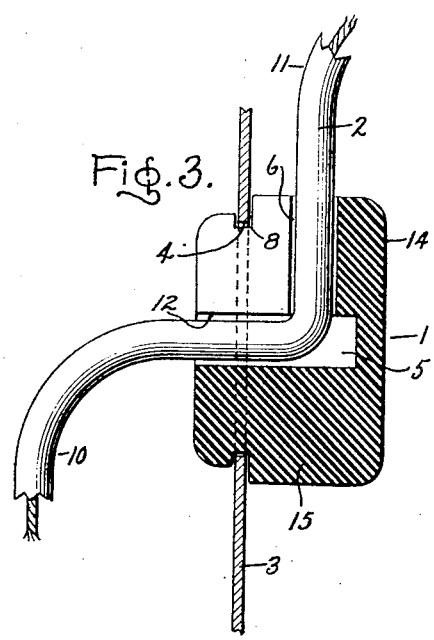
Inventor:
Leslie L. Pruehs
by William G. Edwards, Jr.
His Attorney Patented Oct. 30, 1951

2,573,600

UNITED STATES PATENT OFFICE 2,573,600

STRAIN RELIEF BUSHING

Leslie L. Pruehs, Erie, Pa., assignor to General Electric Company, a corporation of New York Application December 17, 1948, Serial No. 65,935

2 Claims. (Cl. 174—153)

My invention relates to strain relief devices for holding electric cords, and more particularly to strain relief bushings.

It is an object of my invention to provide an improved strain relief device for resisting pull on electric cords.

It is another object of my invention to provide a one-piece strain relief bushing including a shock absorbing bumper portion.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a perspective view of a strain relief bushing; Fig. 2 is an elevation view showing the strain relief bushing mounted in a rigid plate structure; Fig. 3 is a sectional elevation view of the bushing mounted in the plate; and Fig. 4 is an exploded view showing the bushing opened for receiving an electric cord.

In connection with electrical apparatus it is sometimes desirable to provide a strain relief device for preventing transmission to the electrical apparatus of any pull on the electric power supply cord. By way of illustration, it is desirable to assemble the power supply cord for the hermetically sealed refrigerating apparatus of household refrigerators in such a manner that any inadvertent pull on the cord is resisted and is not transmitted to the refrigerating apparatus. This minimizes the danger of any injury to the sealed leads in the case of the hermetically sealed refrigerating apparatus. By my invention, there is provided a simple one-piece molded rubber bushing which is capable of being mounted on a rigid portion of a refrigerator or the like and which is adapted to grip the electric power supply cord.

Referring to the drawing, there is illustrated a bushing 1 which is preferably formed as a generally cylindrical body, composed of a flexible resilient material, such as molded rubber. This bushing is adapted to receive and grip an electric power supply cord 2. The bushing may be mounted on a rigid structure such as a flat plate 3, the bushing being assembled in an opening 4 provided in the plate 3. Although the bushing has been shown as cylindrical it is obvious that other shapes could also be employed if desired.

The bushing includes an axially, or longitudinally, extending passage 5 which passes from one end of the bushing and terminates interiorly of the molded rubber body of which the bushing is composed. The bushing further includes a radially, or transversely, extending passage 6 which passes from one side of the bushing and intersects the passage 5 near the central portion of the bushing. As shown in Fig. 3, the passages 5 and 6 intersect at a right angle, but it will be understood as the description proceeds that any other relatively sharp angle of intersection may be employed.

For receiving an electric cord a slit 7 is provided at one corner of the bushing, the slit extending from the exterior surface to the internal passages 5 and 6. The slit 7 is arranged in the common plane of the two passages 5 and 6. In order to mount the bushing on a rigid structure such as the plate 3, a circumferential groove 8 is formed near one end of the bushing. This groove intersects the slit 7.

The electric cord is assembled within the passages 5 and 6 of the bushing in a manner most clearly shown in Fig. 4. The bushing is spread apart adjacent the slit 7 as illustrated in Fig. 4 to provide a mouth 9, and the cord 2, having been bent in the generally right angular form illustrated, is inserted through the mouth 9. When the cord 2 has been inserted within the passages 5 and 6, the edges of the bushing adjacent the mouth 9 are released and the bushing resumes its normal shape, the mouth 9 closing and the bushing gripping the cord 2. The assembled structure then occupies the position shown in Fig. 1. By reference to Fig. 1, it can be seen that, because of the right angular relationship of the internal passages 5 and 6, a pull on the cord 2 is resisted by the natural resilience of the bushing, this strain relief being accentuated by the natural friction existing between the rubber surface of the insulation of the cord 2 and the rubber surface of the bushing. It will be noted that the passages 5 and 6 need not intersect at a right angle, but may be arranged at any angle substantially less than 180°. The right angle construction is preferred because it provides a satisfactory gripping of the cord and at the same time exhibits little tendency for the cord to be pulled from the bushing through the slit 7, a tendency which increases as the angle is reduced below 90°. The strain relief is effective whether the pull is applied to the end 10 or the end 11 of the cord.

The provision of the groove 8 in the bushing and the arrangement for mounting the bushing within an opening in a rigid plate utilizing this groove further assist the strain relief function, as can be seen by reference to Figs. 2 and 3. When the bushing is inserted in the plate 3 so that the edge of the plate adjacent the opening 4 is received within the groove 8 in the bushing, any tendency of the bushing to spread apart adjacent the slit 7 when a pull is exerted on the end 10 or the end 11 of the cord 2 is resisted. Thus, once the cord has been assembled within the passages 5 and 6 and the bushing has been mounted within the opening 4 in the plate 3, the mouth 9 is maintained closed and the bushing is held in a position wherein it effectively grips the cord 2. While the bushing is preferably made of a material such as rubber having sufficient resilient force to resist a substantial pull on the cord 2, I prefer to mount the bushing in the manner shown so as to introduce an additional resistance to the spreading apart of the bushing under the influence of any pull on the cord. It will be noted further that the slit 7 is located at one side of the passages 5 and 6 rather than at the center. Thus, for example, should an upward pull be applied to the end 10 of the cord the cord comes into engagement with a surface 12 extending entirely across the passage 5 and there is less tendency for the bushing to part at the slit than would be the case if the slit were located centrally. The same observation applies to the engagement of the cord with a surface 13 when a pull to the left, as viewed in Fig. 1, is applied to the end 11 of the cord.

An additional feature of the construction described, wherein the cord enters from one end of the bushing and passes out through the side, is that a relatively extensive, flat, unobstructed surface 14 is provided at one end of the bushing. This surface, because of the resilient nature of the material of which the bushing is composed, is adapted to act as a shock absorber should the bushing engage any stationary structure. In the application to a refrigerator, for example, the plate 3 may be the plate condenser which is positioned vertically along the back of the refrigerator in the conventional natural draft household refrigerator construction. When the bushing is mounted in the condenser the portion 15 extends rearwardly from the condenser, and the bushing not only acts effectively to prevent any pull on the end 11 of the cord from transmitting a strain to the sealed leads of the refrigerating apparatus, but the surface 14 is available as a bumper for engaging any stationary structure, such as a wall, against which the refrigerator might be pushed.

While I have shown and described a specific embodiment of my invention, I do not desire my invention to be limited to the particular construction shown and described, and I intend by the appended claims to cover all modifications within the spirit and scope of my invention.

What I claim as new and desire to secure by Letters Patent of the United States is:

1. A strain relief bushing comprising a body of flexible resilient material, said body having two passages therein, said passages terminating internally of said body and intersecting at substantially a right angle internally of said body, said body having a slit therein extending from the exterior surface thereof and intersecting said passages longitudinally along a line substantially off center of said passages whereby said body may be spread apart at said slit for receiving a cord within said passages.

2. A strain relief bushing comprising a generally cylindrical body of flexible resilient material, said body having an axially extending passage and a radially extending passage therein, said passages intersecting internally of said body, said body having a slit therein extending from the exterior surface thereof to said passages along the length of said passages whereby said body may be spread apart at said slit for receiving a cord within said passages, said slit lying in a plane parallel to and substantially offset from the axis of said body.

LESLIE L. PRUEHS.

REFERENCES CITED

The following references are of record in the file of this patent:

UNITED STATES PATENTS

| Number | Name | Date |
| --- | --- | --- |
| 849,934 | Thomas | Apr. 9, 1907 |
| 957,547 | Crossley | May 10, 1910 |
| 1,135,894 | Havens, Jr. | Apr. 13, 1915 |
| 1,697,814 | Forbes | Jan. 1, 1929 |

FOREIGN PATENTS

| Number | Country | Date |
| --- | --- | --- |
| 24,441 | England | of 1914 |